V. L. EMERSON.
APPARATUS FOR THE CONVERSION OF HYDROCARBON OILS.
APPLICATION FILED MAY 6, 1920.
1,346,797.
Patented July 13, 1920.
3 SHEETS—SHEET 1.
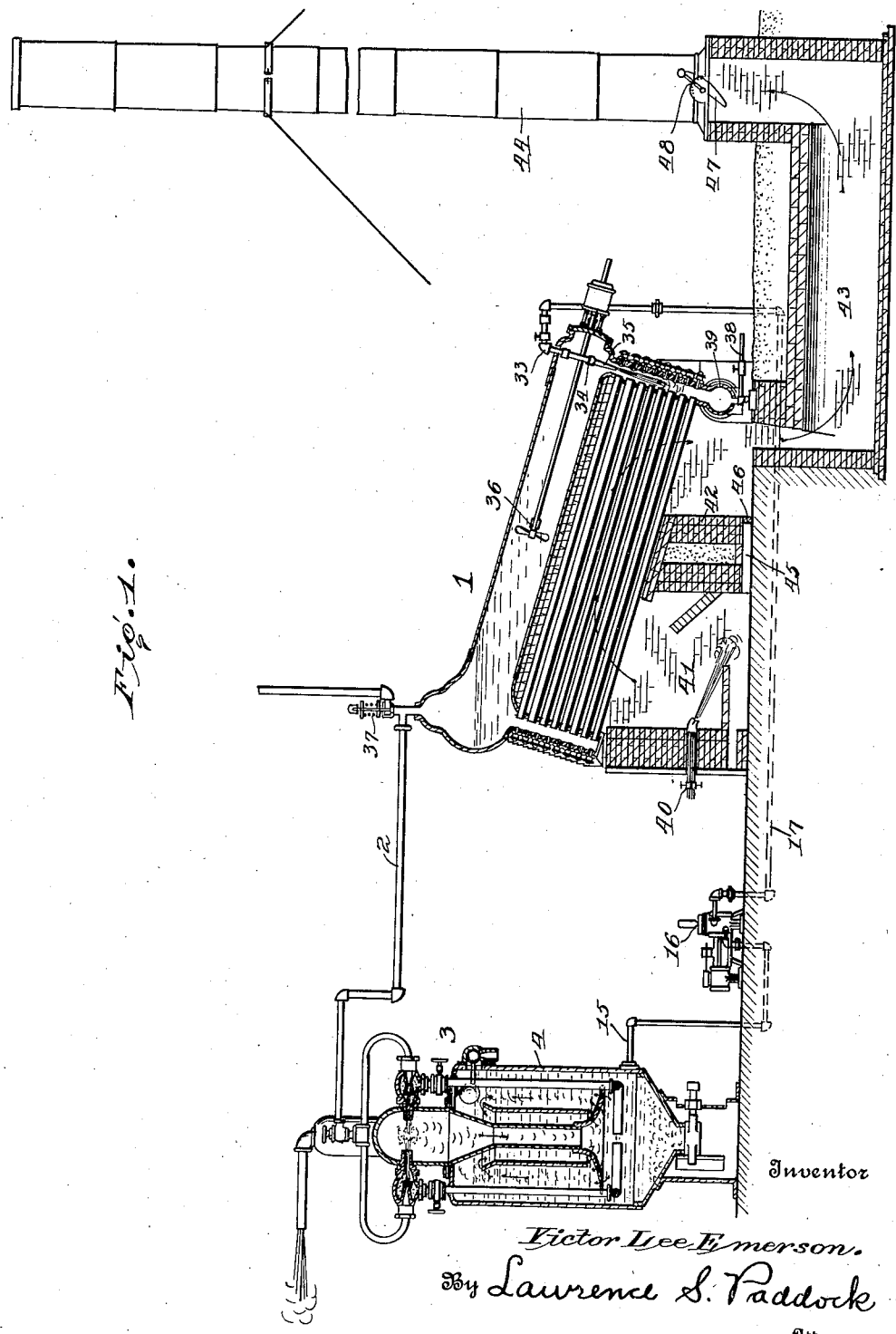
Inventor
Victor Lee Emerson.
By Lawrence S. Paddock
Attorney

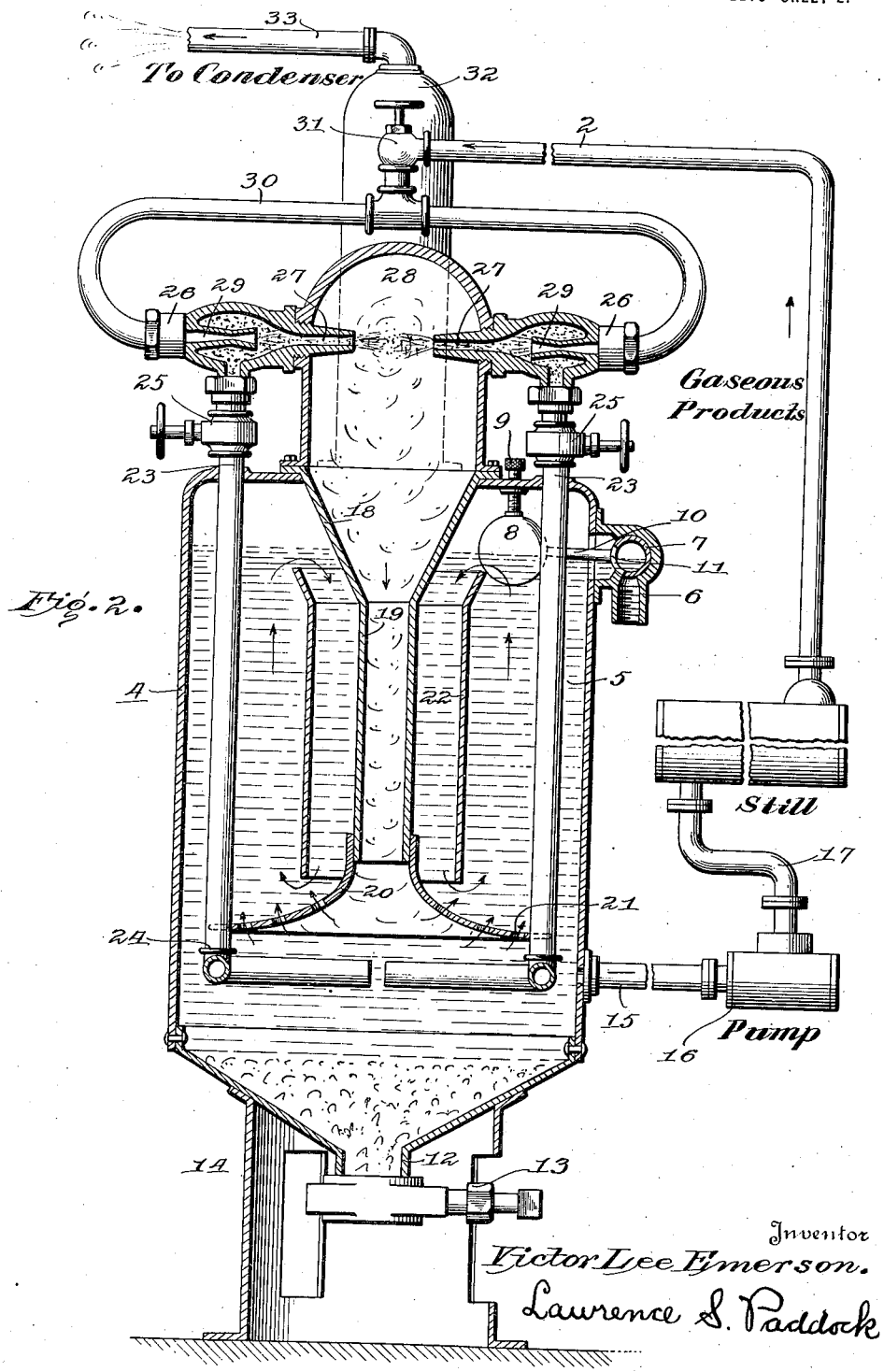

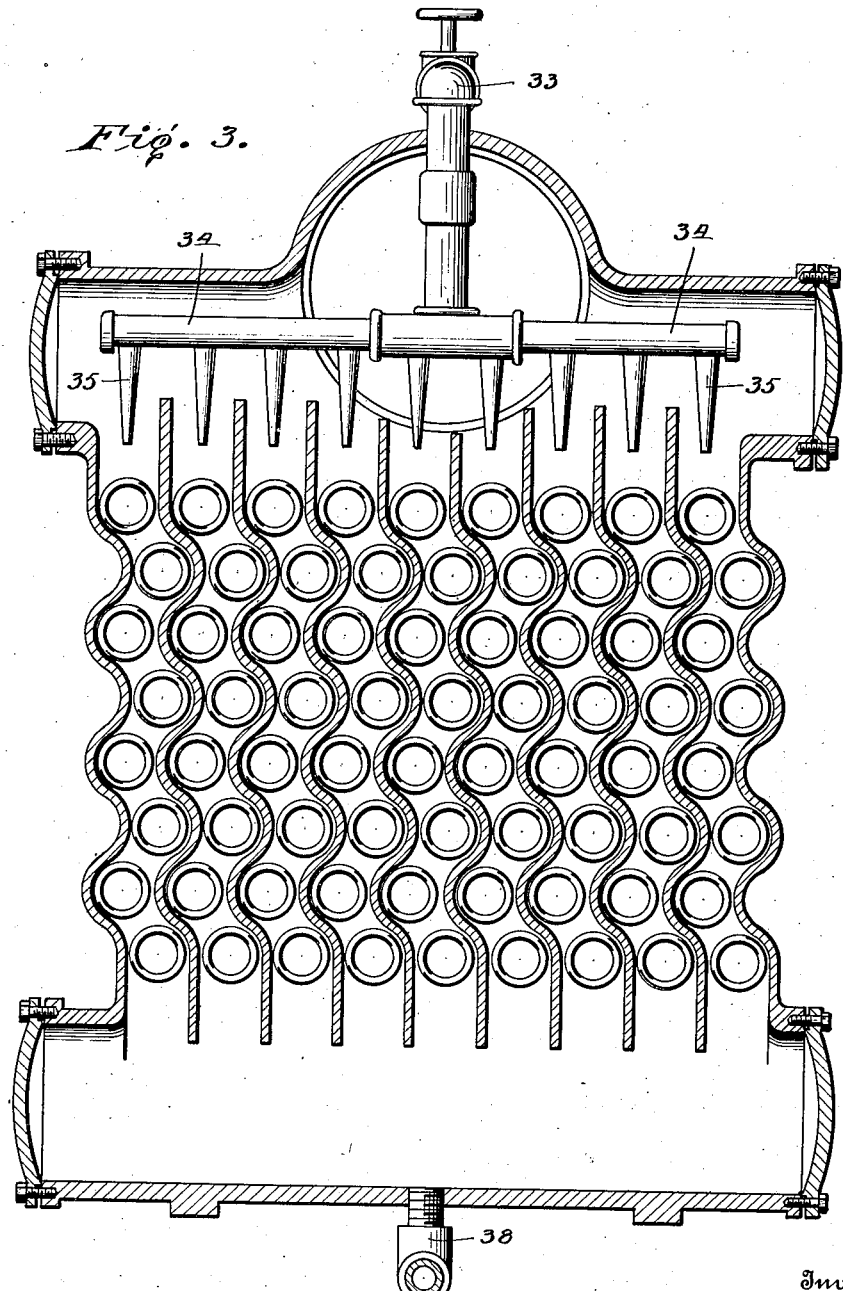

UNITED STATES PATENT OFFICE.

VICTOR LEE EMERSON, OF PHILADELPHIA, PENNSYLVANIA.

APPARATUS FOR THE CONVERSION OF HYDROCARBON OILS.

1,346,797. Specification of Letters Patent. Patented July 13, 1920.

Original application filed May 6, 1920, Serial No. 379,358. Divided and this application filed May 6, 1920. Serial No. 379,357.

*To all whom it may concern:*

Be it known that I, VICTOR LEE EMERSON, a citizen of the United States, residing at Philadelphia, county of Philadelphia, and State of Pennsylvania, have invented certain new Improvements in Apparatus for the Conversion of Hydrocarbon Oils, of which the following is a specification.

While this invention relates broadly to distillation and conversion of complex chemical combinations into new atomic groups, it relates more specifically to an apparatus for the conversion of heavy hydrocarbon oils into lighter hydrogen oils. This application is a continuation in part of my application Serial No. 335,563, filed November 3, 1919.

It is an object of my invention to eliminate the impurities in the oil, such as sulfur and water and similar foreign compounds to prevent them from forming objectionable combinations in the still, such as carbon bisulfid, and to prevent the elements of oxygen and hydrogen contained in any water present in the oil and forming explosive compounds by uniting with the carbonaceous vapors or gaseous products in the still. Heretofore oil stills have usually been fed directly with the oil without previously treating the same so that the impurities or foreign matter referred to are removed, which often results in the destruction of the still or serious interference with the operation of the process. Violent explosions have taken place where there was apparently little pressure on the still. These are apparently due to the result of a quantity of water or moisture being fed to the still while it is at a high temperature. Sulfur also accompanies the oil in many cases. The oxygen of the water, combining with the carbonaceous gases, forms chemical combinations in which combustion takes place, rapidly supported by the hydrogen contained in the water and the sulfurous gases present, resulting in violent explosions.

With the present apparatus these dangers are entirely avoided as the contained water and sulfur compounds and other impurities are removed prior to the introduction of the oil into the still. It is an object of the present invention to provide for the removal of impurities or foreign compounds from the oil prior to the admission of the same into the still.

It is a further object of the present invention to utilize the heat in the gaseous products coming from the still to preheat the oil before it is pumped into the still. This results in the evaporation of any water held in suspension and removes any sulfurous compounds that might enter into combination with either the oil, water or gaseous products. At the same time, a portion of the heavier products coming over in gaseous form from the still, are condensed by contact with a body of oil which is at a lower temperature and conversely the readily vaporizable material in the body of oil is transformed into vapor by the heat transmitted to the same from the gaseous products brought in contact therewith.

It is likewise an object of my invention to subject the heavier oil to the action of impact and the heat of the gaseous products from the still, and to combine the same with such products from the still as are condensed on contact with the body of oil at a lower temperature. The preheated and pretreated oil and condensates are injected into the material contained in the still and are subjected to a cracking reaction by reason of the higher temperature of the material into which they are injected.

It is obvious that the material into which they are injected is at a higher temperature than the material injected. This is due to the fact that the material in the still has been robbed of the lower boiling oils by distillation.

In carrying out the operation the hydrocarbons having a relatively low boiling point, are subjected to the heat of the residual hydrocarbons undergoing treatment under high pressure and temperature which have a high boiling point. The supply of low boiling hydrocarbons to the high boiling hydrocarbons in the still not only utilizes the temperature and heat of the high boiling hydrocarbons to cause the cracking reaction of the low boiling hydrocarbons, but the low boiling hydrocarbons, when intermixed with the high boiling hydrocarbons, act to maintain the entire mixture in such a state as to avoid the formation of hard carbon and free gas by excessive cracking due to the extreme temperatures accompanying a reduction of the distillate to a high boiling point. This action is present to a large extent in the ordinary apparatus.

It is a still further object of my invention to utilize the pressure and heat of the gases as they come over from the still to give a high velocity to the gaseous products from the still sufficient to cause molecular dissociation on impact either of the gaseous products themselves or in combination with the oil. The molecular dissociation produces a condition inducive to the formation of new atomic groups and the production of a product of lighter gravity and lower boiling point.

Before proceeding to describe the apparatus in detail, I deem it best to explain certain theories which I believe are involved, but I do this merely in order that those skilled in the art may more clearly appreciate its peculiar characteristics and may consequently apply it in practical use. I wish it to be understood that the patentable novelty of my apparatus does not depend upon the scientific accuracy of the theories advanced. The theories are given by way of explanation of the phenomena occurring in operation. While not limiting myself to any one theory or hypothesis, it would appear that the high velocity of the gaseous products from the still, and fluid intermixed therewith, give rise to a molecular attrition of extreme violence at the point of impact. A large amount of heat is also liberated at the point of impact. The attrition caused by impact aids at this point to reduce the masses to very fine particles which renders them particularly susceptible to chemical dissociation due to the action of the various phenomena attendant upon impact. One of the phenomena attendant upon impact, which I believe aids in the chemical dissociation, is that of ionization. The friction attendant upon attrition at the point of impact sets up an electrical effect which causes the ionization. The heat liberated at the point of impact has its well known function of aiding the chemical action at this point and supplies heat to be subsequently utilized in the treatment of the hydrocarbons during the cycle of operation. The cracking decomposition of organic compounds by heat is explained on the basis of the occurrence of inter-molecular collisions of such violence that the bonds holding together the various atoms or groups are ruptured. The degree of cracking varies as the temperature to which the substance is heated. The shock of impact sets up violent molecular vibrations which cause inter-molecular collisions similar to the action of heat which cause dissociation on impact. All these phenomena are attendant upon impact and are inducive to the chemical dissociation herein set forth. It is sufficient to say that, due to such effects as these, a molecular arrangement is produced and new atomic groups are formed and a very large proportion of the lighter and simple hydrocarbons result from this reaction.

The preheating of the hydrocarbon mass causes the hydrocarbons to approach the point of impact in a heated state, and consequent readiness to be cracked by the action of impact and its attendant phenomena. In obtaining this dissociation by impact and its attendant phenomena, there is an absence of the surrounding pressure which would otherwise be essential were it to be carried out in a confined chamber under heat.

It will be apparent that the gaseous products and liquid hydrocarbons are rapidly subjected to temperature changes. The gaseous products, on reaching the jets, have been cooled by expansion, thereafter they are heated by impact and are again cooled by being brought in contact with the liquids which are maintained at a lower temperature than the gaseous products. The liquids are raised in temperature by intermixture with the gaseous products from the still and undergo temperature changes along with these gaseous products. The constant rapid change of temperature promotes the dissociation of the hydrocarbon molecules by subjecting them to repeated and sudden changes in stress due to temperature changes, which tend to overcome their chemical inertia. Thus, the molecular dissociation of the high boiling heavy hydrocarbon oils is accomplished in a manner which avoids a temperature productive of a pressure which would be destructive to the containing vessel in the ordinary apparatuses.

The term "attrition" is used in the description of the reaction taking place on impact, but it should be understood that this term not only covers a mechanical attrition but a molecular and atomic attrition as well in the present instance.

Other objects and advantages of the invention will appear hereinafter.

In order to render my present invention clear, reference is had to the accompanying drawings in which—

Figure 1 is a vertical section of one form of apparatus for carrying out the conversion of hydrocarbon oils;

Fig. 2 is a vertical section of that portion of the apparatus shown at the left of Fig. 1 on an enlarged scale in which the still and pump are shown diagrammatically;

Fig. 3 is a vertical section of the rear heater of the still shown in Fig. 1, illustrating in particular the liquid impelling apparatus.

In the apparatus disclosed in Fig. 1, I employ a still shown at 1. While it is within the scope of my invention to employ various types of stills, I prefer to use the type which is herein shown, being the type of still shown in my Patent No. 1,337,831, granted April 20, 1920, with certain modifications as will hereinafter appear. While my apparatus is capable of being operated through a wide range of temperatures and pressures, and the details of the apparatus are capable of variation within the scope of my invention which is not limited to the particular temperatures, pressures or details mentioned or disclosed, the following is an example of the execution of my process in a particular instance. While my apparatus is adapted for the conversion of hydrocarbon oils broadly, I find that satisfactory results, when operating on fuel oil, will be obtained by the use of a pressure in the still of 75 to 100 pounds per square inch with an accompanying temperature of seven hundred to eight hundred degrees Fahrenheit. With this temperature and pressure, a cracking reaction will take place with the attendant formation of gaseous products. The products of distillation which come over from the still include true gases, such as hydrogen, vapors, saturated vapors and gases, and particles of the material undergoing distillation which return in the liquid form and are held in suspension by the gaseous products. I use the term "gaseous products" to cover all the material coming over from the still as described.

To facilitate the description, I refer to the apparatus to the left of Fig. 1 to which the gaseous products from the still are delivered, as the primary still and the high pressure still to the right of Fig. 1 as the secondary still, since the oils is first treated to partial distillation in the primary still and further distillation in the secondary still.

In the form of apparatus herein shown, the gaseous products from the secondary still 1 are led by a pipe 2 to a primary still 3. In this form of apparatus the receptacle 4 is of any desired shape or size to which a supply of fresh heavy hydrocarbon oil indicated at 5, is fed through a suitable feed pipe 6 which is controlled by a valve 7. This valve may be either manually or automatically controlled to maintain a certain predetermined quantity of oil in the apparatus. The valve 7 herein shown is controlled by a float 8, the limit of whose action is controlled by an adjustable thumb screw seated in the top wall of the receptacle. The revoluble member of the valve 7 is connected to the float 8 by a bar 10. The float in its vertical movement controls the degree of oscillation of the valve 7 and brings the opening 11 in the latter into or out of register with the feed pipe and the receptacle 4 for the purpose of controlling the flow of oil to the receptacle 4. The bottom of the receptacle 4 is preferably tapered toward a central outlet 12 controlled by a gate valve or other closure means 13, through which the solid or other material which settles to the bottom of the receptacle may be drawn off from time to time. A suitable pedestal 14 is provided for supporting one receptacle 4 at a convenient height to permit the valve 13 to be manipulated. In the lower portion of the wall of the receptacle, an outlet pipe 15 is provided through which outlet the contents of the receptacle, after treatment therein, may be pumped or forced by the pump 16 into the material undergoing distillation in the secondary still 1 through the pipe 17 and liquid impelling jet apparatus shown in enlarged detail in Fig. 3.

It will thus be evident that the primary still forms an intermediary between the source of supply and the secondary still. Within the apparatus the supply of heavy oil is purified, preheated and predistilled to a certain extent. It also follows that the fresh material will serve to condense such portions of the gaseous products from the secondary still which are injected into the fresh material in the primary still as are condensable at the temperature at which the material in the receptacle 4 is maintained. These condensates, along with the predistilled and preheated fresh oil are then carried to the secondary still and injected into the material undergoing distillation therein as shown, whereby a cracking reaction takes place between the material injected and the material undergoing distillation, as described.

The top wall of the receptacle 4 has a central opening with a downwardly depending member 18 which terminates in a vertical pipe 19, the lower end of which carries a flaring or bell-shaped member 20. This bell-shaped member extends to points adjacent the wall of the receptacle 4 and is there perforated with a series of holes 21. Surrounding the member 18 and concentric therewith is a tubular baffle member 22 for the purpose of promoting circulation within the receptacle. Diametrically disposed in the top wall of the receptacle 4 are mounted vertical pipes 23 terminating at their lower portion and below the flange member 20 in elbows 24, the inner ends of the elbows being open and providing free entry for the fluid contained in the receptacle into the pipes 23. The upper ends of the pipes 23 are connected by regulating valves 25 with chambered cross pipes 26. The pipes 26 terminate radially of the receptacle 4 in jet nozzles 27, having a common axis through the diameter of the receptacle 4. The reaction chamber 28, which is mounted on top of the receptacle 4 and forming a continuation of the member 28, is adapted to surround the jets 27. Entrant jet nozzles 29 form part of the cross members 26 and terminate above the axis of the pipes 23. The entrant jets 29 are fed from the manifold 30 which is adapted for connection to the secondary still 1 by means of the pipe 2. A regulating valve 31 controls a supply of gaseous products from the secondary still 1. While only two jets are shown in the present modification, it will be understood that any number of jets, with their accompanying pipes, may be employed, or the jets may play upon a baffle.

In order to impart proper kinetic energy to the gaseous products, satisfactory results may be obtained by the use of a jet apparatus such as disclosed, following proportions based upon the standard practice in connection with steam injectors for the feed water of boilers, as disclosed in my copending application Serial No. 379,358, filed May 6, 1920, of which this application is a division.

Mounted upon the top wall of the receptacle 4 is a vapor dome 32 which is provided with an outlet pipe 33 to lead the gaseous products to a condenser or other suitable apparatus for fractionally separating the desired products.

In carrying out the operation in connection with the form of apparatus shown, the valve 31 is opened permitting the gaseous products under high pressure from the secondary still 1 to pass through the manifold 30 into the jets or nozzles 29. The gaseous products from the still pass through the jets 29 which are so designed as to produce a high velocity by expansion, and they are delivered from the nozzles 27 into the reaction chamber 28 wherein they impinge upon one another. The jets having given the fluid issuing therefrom a very high velocity, imparts thereto kinetic energy which is expended at the point of impact.

The gaseous products from this step now pass down the pipe 19 and bubble up through the body of the liquid 5 in the receptacle 4. In this way the heat brought over by the stream of gaseous products from the secondary still 1 and the heat caused by the impact of the fluid jets serve to heat the body of liquid in the receptacle 4 as a preliminary step to its treatment in the secondary still 1. By this means the temperature of the contents of the receptacle is kept well above the boiling point of water and the water contained in the heavy oil supplied thereto is thereby entrained as a vapor by the gaseous products and carried out through the vapor dome 32, together with vaporized sulfurous compounds. By this action the heavy oil is dehydrated and desulfurized prior to its treatment in the secondary still 1, and the lighter hydrocarbons existing in the heavy oil are fractionally removed before the oil enters the secondary still 1. It may also be possible that some additional action may take place between the freely ionized gaseous products from the jets and the heavy material in the receptacle.

The use of the baffle member 22 serves to set up convection currents, which materially aid in the heating of the material in the receptacle and the separation of the impurities and foreign substances from the fresh supply of oil before treatment in the still. The upwardly moving material carries the gaseous products in bubbles which are released at the surface of the liquid and permits the latter to return through the channel between the pipe 19 and the member 22. The solid material which has been separated out settles to the bottom of the receptacle 4 and is drawn off periodically by means of the valve 13. While this reaction just discussed may be carried out without the presence of liquid material in the zone of impact, it has been found advantageous to inject into the reaction chamber and into the field of the impinging masses, a certain portion of heavy oil. By suitable manipulation of the valves 25, the jets 29 and nozzles 27 act as injectors which serve to lift the liquid through the pipes 23, mix it with the incoming jets of hot gaseous products from the secondary still 1, and project the mixture at high velocity into the reaction chamber 28 where it is subjected to heat and treatment by impact.

In operation it is desirable to regulate the valves 25 so as to regulate the flow of oils into the jets in such a manner that in the preliminary steps to operation, a sufficient flow of oil may be passed through the jets to quickly heat up the oil in the receptacle to the desired point. The flow of oil is then diminished to such a point that the gaseous products may attain a high velocity, together with the oil in a very finely divided state. Thereafter, both the gaseous products and the oil in a finely divided liquid state are subjected to impact with its consequent reaction.

The liquid particles, intermixed with the gaseous products, act to increase the action of impact by mutual impact with them and are subject to dissociation themselves, due to the action of impact. The friction caused by the attrition of the mutually impacting masses is inducive to the formation of static electricity with its consequent ionizing effect.

During the cracking distillation occurring in the secondary still 1, a portion of the gaseous products are cracked, while other portions remain uncracked. These gaseous products are subjected to the action of impact by means of jet apparatus, with the result that the gaseous products are subjected to dissociation on impact and the uncracked gaseous products from the still likewise undergo dissociation. In this manner the gaseous products from the still and the liquid from the receptacles 4 are subjected to dissociation which results in new atomic groups and a product of lighter gravity and lower boiling point.

In carrying out my process the water vapor present in the oil may enter into the action taking place in the reaction chamber 28, a hydrogenating effect taking place. If desired, water could be added to the heavy oil in the receptacle or directly to the jets, in order to increase a hydrogenating effect. Hydrogen gas can also be admitted in the same manner and for the same purpose.

Referring to Fig. 3, it will be seen that the oil fed to the secondary still 1 by the pump 3 is injected into the oil undergoing distillation by means of a multiple jet apparatus, shown at 33, which is composed of a spreader 34 from which depend a series of nozzles 35. These nozzles extend downwardly between the partitions of the rear header so as to cause a rapid impelling of the material undergoing distillation in a uniform manner. When operating with viscous material it is desirable to use a mechanical device, such as a propeller which I have shown at 36 in combination with the jets 35. When this is done the pipe connections to the jet apparatus 33 will be so formed as to permit the proper location of the driving means for the propeller. It may be found desirable to use either the propeller or the jets alone in certain instances. A safety valve 37 is located in the pipe line 2 to relieve any dangerous pressure in the still 1. A drain pipe, shown at 38, permits the removal of the residues which collect in the trap 39. A fuel burner located at 40 is so designated as to direct the flame downwardly in the furnace 41 as shown. I find it desirable to direct the flame of the burner downwardly so that the heat therefrom will be conducted to the pipes by radiation rather than by direct contact therewith. I find that this assists in avoiding over cracking of the oil due to the successive localized heat and results in a more even distribution of the heat. A partition 42, 42 is so placed that the gases of combustion are caused to pass from the upper end of the tubes along their length and thence downwardly through the pit 43, from whence they escape through the stack 44. The partition 43 is so constructed as to form a passage 45, 45 at the bottom thereof. This passage is normally obstructed by a brick or bricks, indicated at 46. If it should happen that from any cause the tubes or other portion of the still should be destroyed so as to allow an escape of the oil therein, the oil would push the brick or bricks 46 out of the passage 45 and the oil would fill the pit 43, thus forming a liquid wall in such a manner as to cut off the draft. This stifles the conflagration if the draft were not shut off.

In the base of the stack 44 is placed a weighted valve 47 which is held in open position by a plug 48, of such material as will be effected by excessive heat to destroy the function thereof. I find that a plug of wood in this position satisfactorily performs the desired function, although other temperature-responsive material might be used. If the temperature of the gases of combustion passing through the stack becomes so great as to destroy the plug, the weight on the valve will cause the valve to close off the draft, thereby reducing the temperature of the still below the danger point.

While the particular embodiment of my invention has been described with reference to the treatment of petroleum for the production of lighter hydrocarbons, it is of course to be understood that my apparatus may operate on chemicals other than hydrocarbons. It is also to be understood that other conditions and reactions than those described may be present in the process and come within the scope of the appended claims.

What I claim is:

1. In an apparatus for the conversion of hydrocarbon oils, the combination of a still operable under pressure, an oil receptacle, means for supplying fresh oil to said receptacle, means for subjecting the gaseous products of distillation from said still to impact, and means for conducting the products of impact into the oil in said receptacle.

2. In an apparatus for the conversion of hydrocarbon oils, the combination of a still operable under pressure, an oil receptacle, means for supplying fresh oil to said receptacle, a jet apparatus adapted to subject the gaseous products of distillation from said still to impact, means for conducting gaseous products of distillation to said jet apparatus, and means for conducting the products of impact from said jet apparatus into the oil in said still.

3. In an apparatus for the conversion of hydrocarbon oils, the combination of a still operable under pressure, an oil receptacle, a jet apparatus adapted to subject separate masses of the gaseous products of distillation to mutual impact, means for conducting the gaseous products of distillation to said jet apparatus, and means for conducting products of impact into the oil in said receptacle.

4. In an apparatus for the conversion of hydrocarbon oils, the combination of a still operable under pressure, an oil receptacle, means for supplying fresh oil to said receptacle, means for subjecting the gaseous products of distillation from said still to impact, means for conducting the products of impact into the oil in said receptacle, means for conducting the mixture of residual oil and condensates formed on contact of the products of impact with said oil to said still and injecting them into the material undergoing distillation therein, and means for removing and condensing the gaseous products in said receptacle.

5. In an apparatus for the conversion of hydrocarbon oils, the combination of a still operable under pressure, an oil receptacle, jet apparatus adapted to subject the gaseous products of distillation from said still to impact, a casing connected to said jet apparatus so as to receive the gaseous products of distillation therefrom, said casing forming a closure within which said gaseous products of distillation are subjected to impact, a conduit leading from said casing adapted to conduct the products of impact therefrom into the oil in said receptacle, and means for supplying said receptacle with fresh oil.

6. In an apparatus for the conversion of hydrocarbon oils, the combination of a still operable under pressure, an oil receptacle, means for supplying fresh oil to said receptacle, a jet apparatus, a casing mounted on said receptacle, means for conducting the gaseous products of distillation from said still to said jet apparatus, said jet apparatus and casing being so connected and constructed as to cause the gaseous products of distillation to be subjected to impact within said casing, a conduit connected to said casing and extending into said receptacle adapted to conduct the products of impact from said casing into the oil in said receptacle, and an outlet conduit for the gaseous products in said receptacle.

7. In an apparatus for the conversion of hydrocarbon oils, the combination of a still operable under pressure, an oil receptacle, means for supplying fresh oil to said receptacle, a jet apparatus, a casing mounted on said receptacle, means for conducting the gaseous products of distillation from said still to said jet apparatus, said jet apparatus and casing being so connected and constructed as to cause the gaseous products of distillation to be subjected to impact within said casing, a conduit connected to said casing and extending into said receptacle adapted to conduct the products of impact from said casing into the oil in said receptacle, conduits connected to said jet apparatus and extending into said receptacle adapted to conduct oil from said receptacle to said jet apparatus in such a manner as to be mixed with the gaseous products of distillation passing through said apparatus, and an outlet conduit for the gaseous products in said receptacle.

8. In an apparatus for the conversion of hydro-carbon oils, the combination of a still operable under pressure, an oil receptacle, means for supplying fresh oil to said receptacle, a jet apparatus, a casing mounted on said receptacle, means for conducting the gaseous products of distillation from said still to said jet apparatus, said jet apparatus and casing being so connected and constructed as to cause the gaseous products of distillation to be subjected to impact within said casing, a conduit connected to said casing and extending into said receptacle adapted to conduct the products of impact from said casing into the oil in said receptacle, means within said receptacle for augmenting convection currents in the oil therein, and an outlet conduit for the gaseous products in said receptacle.

9. In an apparatus for the conversion of hydro-carbon oils, the combination of a receptacle, a jet apparatus, a manifold for supplying a fluid to said jet apparatus, a casing connected to said apparatus adapted to receive the discharge of fluid from said jet apparatus, a conduit connected to said casing and extending into said receptacle, a plurality of valve controlled means connected to said jet apparatus and extending into said receptacle adapted to conduct fluids from said receptacle to said jet apparatus so as to be intermixed with the fluid passing therethrough.

10. In an apparatus for the conversion of hydrocarbon oils, the combination of a receptacle, a jet apparatus comprising a plurality of nozzles, a manifold connecting said nozzles, casings surrounding said nozzles, said casing being provided with nozzles adapted to receive the fluid from said first named nozzles, a plurality of pipes extending into said receptacle and connected with said casings surrounding said last mentioned nozzles and adapted to conduct fluids from said receptacle into said casings, and means for controlling the flow of fluids into said casings.

11. In an apparatus for the conversion of hydrocarbon oils, the combination of a receptacle, a jet apparatus, a casing connected to said jet apparatus so as to cause the fluids therefrom to be subjected to impact within said casing, a conduit connected to said casing and extending into said receptacle, and an open-ended casing surrounding said conduit in said receptacle.

12. In an apparatus for the conversion of hydrocarbon oils, the combination of a receptacle, a jet apparatus, a casing connected with said jet apparatus so as to cause the fluids therefrom to be subjected to impact within said casing, a conduit connected to said casing and extending into said receptacle, said conduit being provided with a bell-shaped member at the outer end thereof, and an open-ended casing surrounding said conduit in said receptacle and extending to a point in proximity to said bell-shaped member.

13. In an apparatus for the conversion of hydrocarbon oils, the combination of a receptacle, a jet apparatus, a casing connected with said jet apparatus so as to cause the fluids therefrom to be subjected to impact within said casing, a conduit connected to said casing and extending into said receptacle, said conduit being provided with a bell-shaped member at the outer end thereof, an open-ended casing surrounding said conduit in said receptacle and extending to a point in proximity to said bell-shaped member, a plurality of conduits extending into said receptacle and connected to said jet apparatus and to be mixed with the fluids passing therethrough, said conduits having portions extending beneath said bell-shaped member, and means for controlling a supply of fluid to said receptacle.

14. In an apparatus for the conversion of hydrocarbon oils, the combination of a receptacle, a jet apparatus, a casing connected with said jet apparatus so as to cause the fluids therefrom to be subjected to impact within said casing, a conduit connected to said casing and extending into said receptacle, said conduit being provided with a bell-shaped member at the outer end thereof, an open-ended casing surrounding said conduit in said receptacle and extending to a point in proximity to said bell-shaped member, a plurality of conduits extending into said receptacle and connected to said jet apparatus so as to conduct fluids from said receptacle to said jet apparatus and to be mixed with the fluids passing therethrough, said conduits having portions extending beneath said bell-shaped member, a valve controlled outlet at the bottom of said receptacle, and means for controlling a supply of fluid to said receptacle.

In testimony whereof I have hereunto set my hand.

VICTOR LEE EMERSON.